Sept. 12, 1933.                G. H. CONNORS                1,926,264
                  AUTOMATIC COUPLING MECHANISM FOR VEHICLES
                         Filed Jan. 12, 1932        2 Sheets-Sheet 1
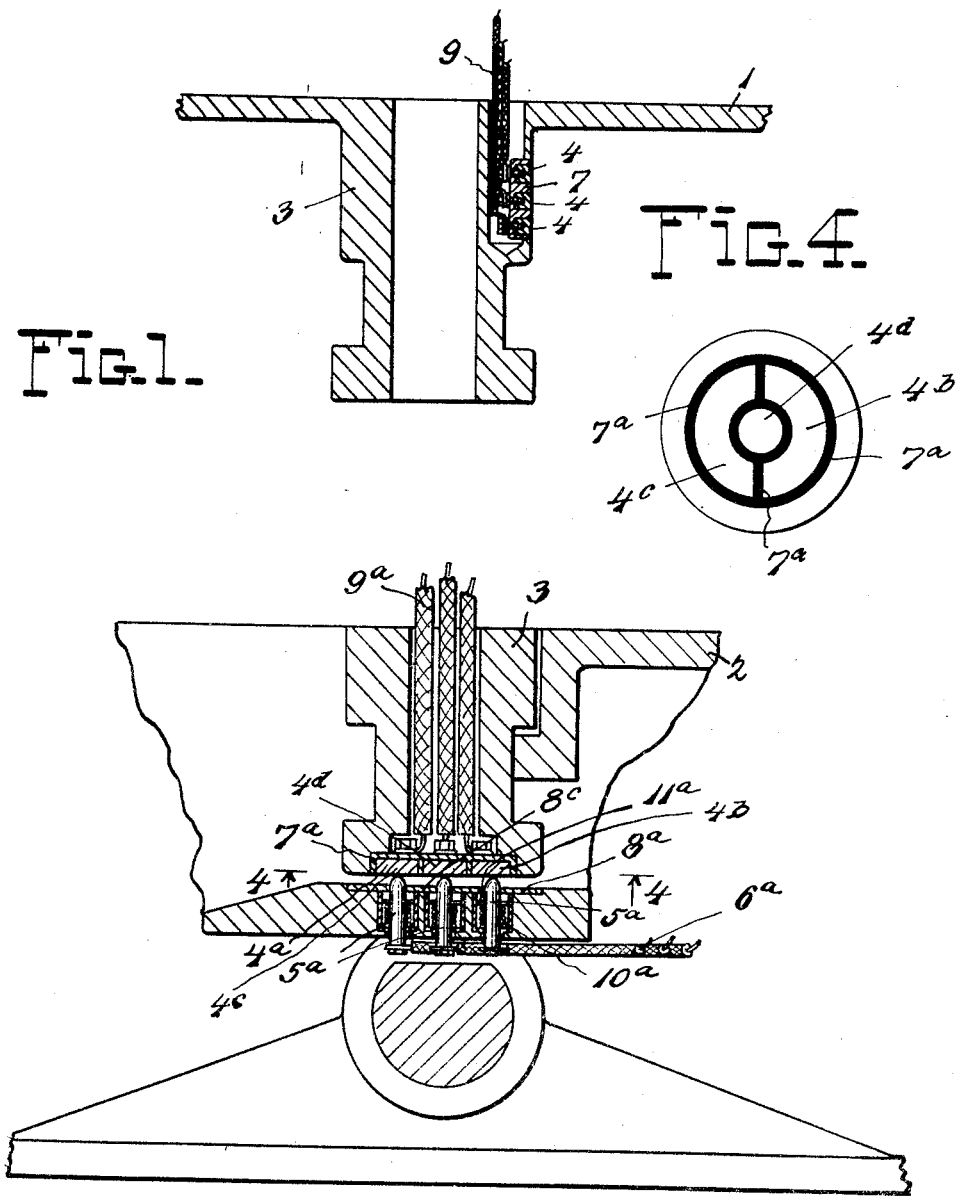
Inventor
GEORGE H. CONNORS
By
Attorneys Sept. 12, 1933.  G. H. CONNORS  1,926,264
AUTOMATIC COUPLING MECHANISM FOR VEHICLES
Filed Jan. 12, 1932  2 Sheets-Sheet 2
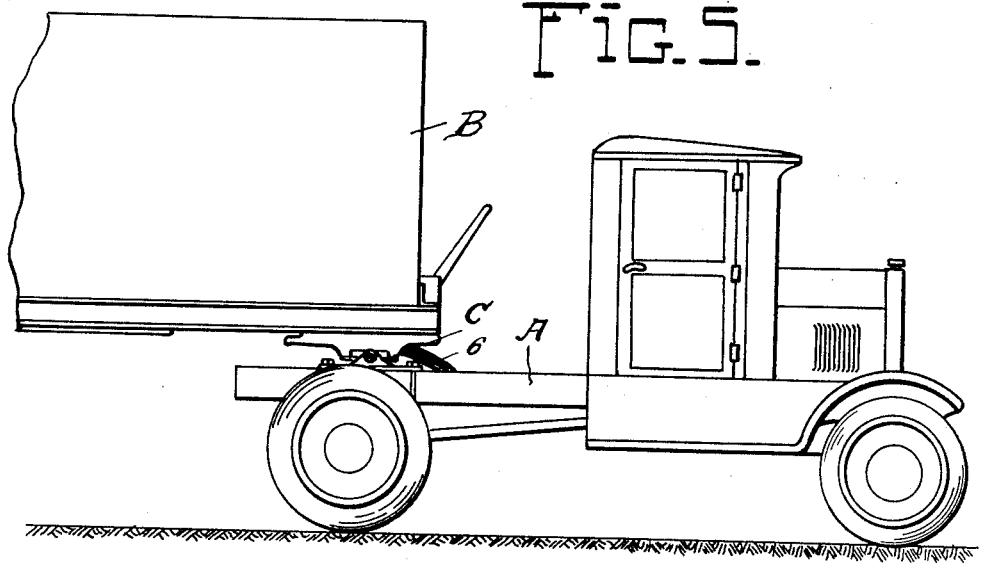
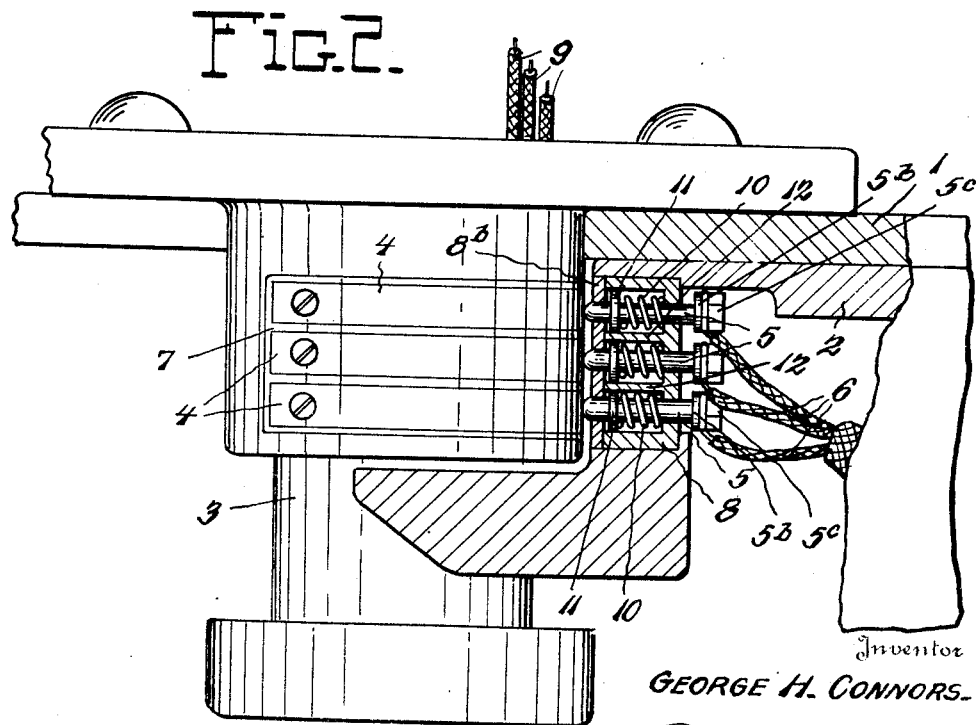
Inventor
GEORGE H. CONNORS
By Robert Ross
Attorneys Patented Sept. 12, 1933

1,926,264

UNITED STATES PATENT OFFICE 1,926,264

AUTOMATIC COUPLING MECHANISM FOR VEHICLES

George Henry Connors, Edgerton, Wis., assignor to Highway Trailer Company, Edgerton, Wis., a corporation Application January 12, 1932. Serial No. 586,242

4 Claims. (Cl. 280—33.1)

For transportation of articles of freight, or the like, there is commonly employed a type of vehicular unit made up of a traction vehicle and one or more trailers coupled to the tractor. With the present day trend toward the requiring the brakes on all trailers in such tractor-trailer units as well as on the tractor or truck, and the almost universal use of power brakes to obtain the maximum degree of safety in conformance with the rules and regulations governing vehicle brakes, especially on units of large capacity, it becomes necessary to provide suitable mechanism for connecting the various operating or actuating members which extend between the vehicles. In order to keep abreast of the progress in the full and semi-automatic coupling and uncoupling of the draft devices and associated automatically operated parts, it is desirable to provide automatic connecting mechanism for the electrical circuits extending between the separable units, such circuits being adapted to control the lights, brakes, and other electrically operated devices which might be employed, according to the size of the units or use to which they are to be put.

To these ends, it is an object of the present invention to provide a suitable automatic connector mechanism for connecting the electric cables or conductors for the tail light, stop light, brake mechanism, running lights, etc.

A further object of the invention is to eliminate, insofar as is possible, the wear on the contacts of the connector mechanism, by repeated connecting and disconnecting operations.

A still further object of the invention is to provide an automatic connector mechanism which will operate independently of the relative angle between the truck and trailer during coupling and uncoupling, thereby eliminating the necessity of substantially aligning the truck and trailer for the coupling and uncoupling operations.

Another object of the invention is to provide an automatic connector mechanism which is in the form of an attachment for use on various types of combined vehicle units which are separable, and which is provided with contacts for controlling the operation of the tail light, stop light, brake mechanism, and the like, as aforesaid, wherein the contacts are so constructed that it will be impossible for the brake circuit to be broken irrespective of any operative position which tractor and trailer may relatively assume while being maintained in coupled relation.

A still further object of the invention is to provide the king pin of the usual upper fifth wheel member of the trailer with contacts mounted in a novel manner and leading to the controlled instrumentalities above indicated, these contacts cooperating with suitable cooperating contacts novelly mounted in the usual lower fifth wheel member of the tractor vehicle.

The invention will be more readily understood from the accompanying drawings, in which—

Figure 1 is a sectional vertical view through the king pin mentioned above, showing one way of mounting the contacts.

Figure 2 is an enlarged elevation of the king pin and contacts of Figure 1, showing these in contact with cooperating contacts in the lower fifth wheel member of the tractor, the said lower fifth wheel member and the mounting of its contacts being shown in fragmentary sectional view.

Figure 3 is a sectional view through a king pin carrying contacts, mounted in a somewhat different manner thereon, together with a different mounting of a cooperating set of contacts in the lower fifth wheel member of the tractor, the upper and lower fifth wheel member being fragmentarily shown.

Figure 4 is a bottom view of the king pin of Figure 3, looking in the direction of the arrows of the line 4—4 of Figure 3, and Figure 5 is a side elevation of a tractor-trailer unit, wherein the vehicles are coupled together by instrumentalities embracing the contact devices of the present construction.

Referring more particularly to the drawings, it will be seen that the specific embodiment of the invention relates to a tractor-trailer vehicle unit, in which A represents, generally, the tractor, B the trailer, and C the coupling mechanism for the tractor and trailer, although the present construction is not necessarily limited thereto.

This coupling mechanism comprises the upper fifth wheel member 1 of the trailer, which is connected to the lower fifth wheel member 2 of the tractor through the medium of the king pin 3. Except for the mountings of the respective contacts, the fifth wheel members are of standard construction.

Referring first to the constructions of Figures 1 and 2, it will be seen that the king pin 3 is suitably recessed to receive the arcuate metal contacts 4 of the trailer, which are positioned on the outside surface of the king pin and adapted to engage with the contacts 5 carried by the lower fifth wheel member and connected by suitable cables 6 to the source of current carried by the tractor. These contacts 5 of the tractor project through the lateral wall of the lower fifth wheel member 2 for engagement with the contacts 4, the arcuate shape of which prevents disengagement of the cooperating contacts when the vehicular unit is rounding curves in a highway. It will be seen that the respective contacts are held in separated position by interposing suitable insulation 7 and 8, the contacts 4 having connecting cables 9 leading to the controlled devices.

To assure positive contact at all times, each contact 5 of the lower fifth wheel member is surrounded by a spring 10 which bears against a collar 11 on the contact and against the inner surface of the insulation 8, which is formed as a hollow housing divided by dividing partitions or members 12, which separate the collars of the respective contacts for prevention of short circuiting and serve as guides for always assuring the proper positioning of the contacts 5 against the contacts 4. The resilient mounting of the contacts 5 allows them to yield under service conditions while maintaining them in close engagement with the arcuate contacts 4.

It will be seen from Figure 2 that the contact strips 4 on the king pin extend substantially more than half way around the king pin, the arc being so great that the tractor and trailer may assume all possible operative positions without possibility of the contacts being broken so that the trailer brake remains operative at all times; and if the insulation 7 be formed of a suitably formed sheet and the contact strips 4 mounted thereon, this assembly may be secured as a unit upon the king pin, although the contact strips and insulation may be applied as separate strips, as will be apparent.

As has been previously mentioned, the contact pins 5 are mounted in the insulation 8, this insulation forming a housing composed of side and rear walls, and is completed by a front plate 8b, which is suitably perforated for the passage of the contact pins therethrough, thereby providing a substantially dust and oil proof housing. The front plate 8b also limits the forward movement of the contact pins through engagement therewith of the collars 11, mounted on the contact pins. The contact pins are shown as rounded at their contact ends, and are provided at their other end by a head 5b, threadedly carrying the nuts 5c, for connecting the cables 6 with the contact pins.

In the forms illustrated in Figures 3 and 4 the customary opening through the king pin is availed of for positioning the connecting cables for the contacts, the contacts themselves being disposed through the bottom of the king pin adjacent the opening. These contacts, generally indicated at 4a, are of suitable configuration, such as illustrated in Figure 4, for example, wherein there are two semicircular contacts 4b and 4c, disposed around the third contact 4d. Suitable insulation 7a is positioned between each of the contacts; and this insulation and contacts may be mounted as a unit on the king pin, with the connecting cables 9a, extending through the king pin opening.

The contacts 4a engage the contacts 5a disposed in the lower fifth wheel member, the contacts 5a being similar to the contacts 5, yieldably mounted pins yielding under engagement with the contacts 4a.

These contacts 5a are enclosed in the insulating housing formed of separate units 8a, forming individual compartments for the contact pins 5a, the unit being completed by the cover plate 8c, suitably apertured to receive the contact pins.

Each contact pin is provided with a collar 11a against which bears a spring 10a to force the pins 5a against the contacts 4a. The cables 6a are provided to connect the contacts 5a with a suitable source of current.

It will be understood therefore that each set of contacts may be mounted as a unit and it will be apparent that the resilient mountings of the contact units on the tractor will reduce the likelihood of breakage under service conditions, while the rounded ends of the contact pins reduce the amount of friction between the pins and their cooperating strips. The wear on the contacts is thereby reduced and the protective housings in which the contact pins are placed prevent access of dust and grit or other deleterious materials, thereby assuring long life and smooth operation.

It will also be apparent that there is no possibility of the contacts between the tractor and trailer being broken in service as the trailer can swing freely on its coupling while the arcuate contacts of its king pin cannot become disengaged with the contacts mounted on the tractor, the resilient mountings of which assure a close engagement between the tractor and trailer contacts at all times and in all positions of the vehicles while they are coupled. All the contacts are, moreover, efficiently insulated for assuring no possibility of short circuiting.

Having thus described my invention, what I claim as new and desire to secure by Letters Patent of the United States, is—

1. In a tractor-trailer vehicle combination having draft coupling means including a kingpin on one vehicle and a cooperating fifth wheel member on the other vehicle, a pair of cooperating sets of contact units, one set of which is mounted in the king pin and the other set of which is mounted on the fifth wheel member for engagement with the aforesaid contact unit, one of the said sets of units comprising a plurality of concentrically disposed contacts, including a central contact of substantially circular cross-section and a pair of arcuate contacts substantially surrounding said central contact, insulation interposed between and around each contact but leaving an exposed contact surface, the other set of contacts comprising members adapted to engage the contact surfaces in the aforesaid unit and including a housing, contact pins in the said housing, means urging the said contact pins outwardly against the respective contacts of the other unit, the said units cooperating to maintain unbroken engagement irrespectively of the relative position of the vehicles.

2. In a tractor-trailer vehicle combination having mating draft coupling members adapted to couple the vehicles together, a pair of cooperating sets of contact units, one set of which is mounted in one of the coupling members of one of the vehicles, the other of which is adapted to be mounted in the mating coupling member of the other vehicle, each of the said contact sets comprising a unitary structure adapted to be installed in its respective coupling member, one of the said sets of units comprising a plurality of contact strips, an insulating base therefor, the said base spacing apart the said contact strips, the other set comprising contact pins adapted to engage with the said strips and including an insulating housing having intervening walls spacing the contact pins apart and means resiliently urging the said pins against the said strips.

3. In a tractor-trailer vehicle combination having mating draft coupling members adapted to couple the vehicles together, a pair of sets of contact units adapted to be installed in said mating coupling members of the respective vehicles, one set of the said contacts comprising spaced apart contact strips including a pair of such strips cooperating with each other to define a contact area of substantially circular configuration, a substantially circular contact member enclosed by the said pair of strips and substantially concentric therewith, an insulating base for the said strips, maintaining the said strips in suitable spaced apart relation, the other set of contact units including a plurality of contact pins adapted to engage the respective contacts of the aforesaid unit, an insulating housing for the said contact pins having walls extending intermediate the said pins, means yieldably urging the said pins against the said contacts, each of the said pins being adapted to engage with a corresponding strip of the first mentioned unit, whereby operative contact will be continuously maintained in all coupled positions of the vehicles.

4. In a tractor-trailer vehicle combination having mating draft coupling members adapted to couple the vehicles together, a pair of cooperating sets of contact units, each of which sets is adapted to be respectively mounted in one of the corresponding mating coupling members, one of the said units comprising a plurality of contact strips including a central strip and cooperating strips laterally enclosing the said central strip, an insulating base for the said strips maintaining the said strips in proper spaced apart relation, the other unit comprising an insulating housing, a plurality of contact pins within the said housing, the said housing having walls intermediate the said pins, a collar for each pin engaging the walls of the housing, and guided thereby, and resilient means within the said housing and pressing upon the said collars and opposing walls to urge the said contact pins into engagement with the contact strips, whereby operative engagement between the contact units is continuously maintained in all coupled positions of the vehicles.

GEORGE HENRY CONNORS.